Figure 1:
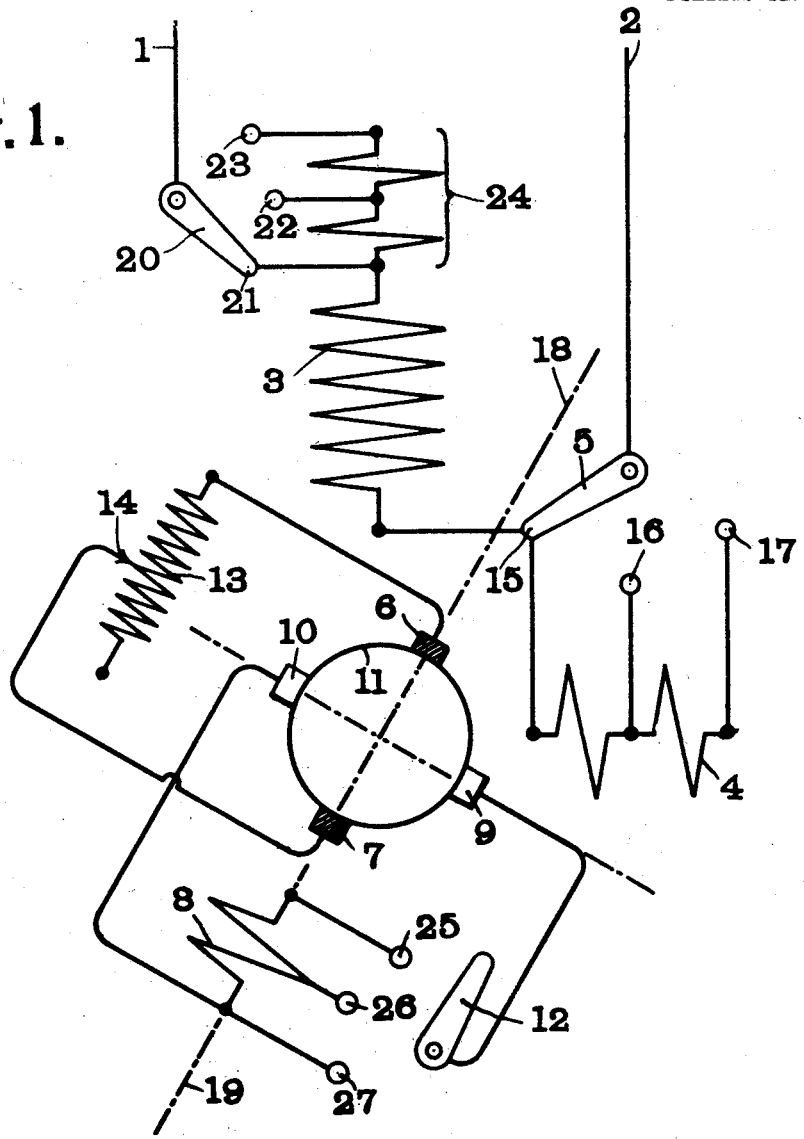

V. A. FYNN.
ALTERNATE CURRENT COMMUTATOR MOTOR.
APPLICATION FILED NOV. 26, 1909.

960,884.

Patented June 7, 1910.
2 SHEETS—SHEET 1.

WITNESSES:
L. L. Mead.
W. A. Alexander.

INVENTOR
Valère A. Fynn.
BY
Fowler & Hoffman
ATTORNEYS

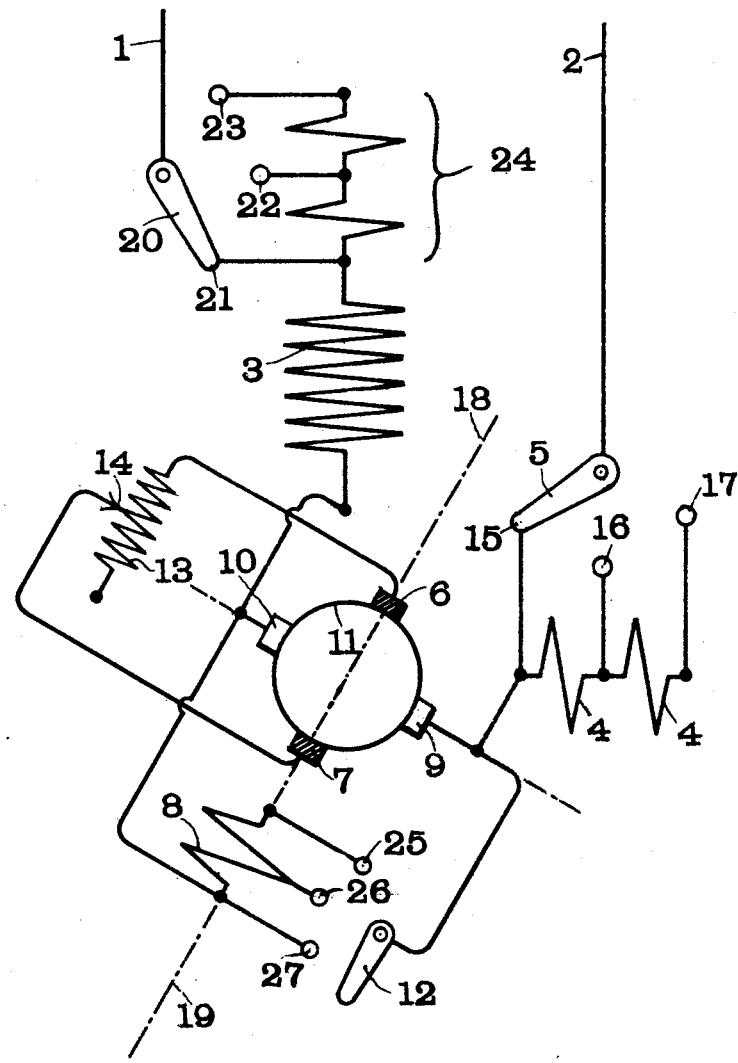

UNITED STATES PATENT OFFICE.

VALÈRE ALFRED FYNN, OF LONDON, ENGLAND.

ALTERNATE-CURRENT COMMUTATOR-MOTOR.

960,884.   Specification of Letters Patent.   Patented June 7, 1910.

Application filed November 26, 1909. Serial No. 529,910.

*To all whom it may concern:*

Be it known that I, VALÈRE ALFRED FYNN, a subject of the King of England, residing at London, England, have invented a certain new and useful Alternate-Current Commutator-Motor, of which the following is such a full, clear, and exact description as will enable anyone skilled in the art to which it appertains to make and use the same, reference being had to the accompanying drawings, forming part of this specification.

My invention relates more particularly to single phase induction commutator motors, its object being to provide improved means for starting and operating such machines.

Motors of this type are generally started as series induction motors, the induced member being closed along an axis displaced with respect to the resultant magnetization due to the inducing windings in circuit at the moment of starting. In the known arrangements such motors are converted into machines with a shunt characteristic, after a sufficient speed has been reached, by closing the induced member along at least one more axis. If only one inducing winding is made use of then neither of the axes along which the induced member is closed will coincide with that of the inducing winding after the conversion with the result that the speed of the motor will drop off very considerably with increasing load. If two displaced inducing windings are used then they are connected in series relation at starting and one of them is gradually switched out, or the ampere turns therein are gradually diminished, as the motor speeds up. In this last known arrangement the axis of the resultant magnetization due to the inducing winding is gradually made to approach the axis along which the induced member is closed at starting and these two axes are made to coincide when the motor has been converted into one with a shunt characteristic. Although the working conditions in this last arrangement are the best possible, yet it is in many cases undesirable to vary during the starting operation the angle of displacement between the axis of the stator magnetization and the axis along which the induced member is closed at starting; furthermore, it is of great advantage to be able to reduce the number of stator turns connected in series between the terminals during some time of the starting performance to a number below that which will be so connected in normal operation thereby greatly increasing the maximum available torque. In other words, it is often of advantage to increase the volts per turn in the inducing winding at starting. In case two displaced inducing windings connected in series relation are made use of, then one of these windings is all in at starting and is gradually switched out or the ampere turns therein are gradually reduced to zero. The torque is small at first, rises to a maximum, then rapidly diminishes becoming zero when one of the inducing windings has been switched out. This is obviously an undesirable condition and has the further disadvantage of necessitating the use of copper on the stator which is idle in normal operation.

According to the present invention, all the stator copper can, when desired, be made use of in normal operation. A greater torque is secured by raising the volts per turn in the inducing winding at starting beyond their normal value and by retaining to the end a favorable displacement between the axis of the resultant stator magnetization and the axis along which the induced member is closed at starting.

In the accompanying drawings, Figure 1 discloses a motor embodying this invention in which the stator inducing windings only are connected to the mains at starting, and Fig. 2 shows a similar machine in which the induced member as well as the inducing windings are connected to the mains at starting.

Referring to Fig. 1, the main 1 is connected to the stator winding 3 at 21 through switch 20 and the main 2 is connected by switch 5 to the stator winding 4 displaced from 3. These two stator windings are permanently connected in series at 15 and switch 5 stands on point 17 in normal operation. Under normal operating conditions the magnetization due to 3 and 4 is coaxial with line 18, 19. The induced member is provided with a commuted winding 11 closed by way of the brushes 6, 7 along this line 18, 19. This closed circuit may contain some regulatable inductive or non-inductive resistance 13 controlled at 14, or it may be directly short-circuited. Another set of brushes 9, 10 displaced from 6, 7 is disposed on 11 and adapted to be short-circuited by switch 12 or closed by that same switch so as to include a compensating E. M. F. in that circuit. In the example shown in Fig.

1, this compensating E. M. F. is derived from an auxiliary winding 8, preferably disposed along the line 18, 19. This compensating E. M. F. can, however, be derived from any other source or in any other manner, it being noted that its phase should approximately coincide with that of the E. M. F. impressed on the inducing winding. At starting, switch 20 stands on point 21 and switch 5 on point 15, and winding 4 is therefore out of circuit. The motor starts with a powerful torque and as its speed increases, approaching the synchronous, 13, if used, is short-circuited and switch 12 is closed, after which winding 4 is included in the stator circuit by means of switch 5 and either gradually or suddenly and switch 12 is so adjusted as to compensate the motor to the desired extent. All of the stator windings are then active and the brushes 6, 7 stand in the best possible position. Should it be desired to reduce the current taken by the motor at the moment when it is first connected to the mains, then a light starting winding such as 24 and coaxial to 3 may be used in series with 3. In such case switch 20 would be placed on point 23 when closing the motor circuit and gradually moved down to 21 the rest of the operation being as previously described.

In Fig. 2 the induced member has been included in the starting circuit, being connected in series with 3 by way of the brushes 9, 10. When 20 stands on 21 and the motor has reached a sufficient speed, the brushes 6, 7 are preferably short-circuited, switch 12 is closed and switch 5 is brought over to point 17. The winding 24 may be left out in this combination as well as in that shown in the first figure. The resistance 13 need not be made use of in either case.

Having fully described my invention, what I claim as new and desire to secure by Letters Patent of the United States, is:

1. In an alternating current motor, the combination with an inducing member provided with a main inducing winding and an auxiliary winding displaced therefrom and inactive at starting, of an induced member closed by means of working brushes along an axis displaced from that of the main inducing winding, means for closing the circuit of the induced member along a second axis, and means for connecting the auxiliary winding in series relation with the main inducing winding.

2. In an alternating current motor, the combination with an inducing member provided with a main inducing winding and an auxiliary winding displaced therefrom and inactive at starting, of an induced member closed by means of working brushes along an axis displaced from that of the main inducing winding, means for closing the circuit of the induced member along a second axis, and means for placing a variable number of turns of the auxiliary winding in series with the main inducing winding.

3. In an alternating current motor, the combination with an inducing member provided with a main inducing winding and an auxiliary winding displaced therefrom and inactive at starting, of an induced member closed by means of working brushes along an axis displaced from that of the main inducing winding, means for impressing a compensating E. M. F. on the induced member along a second axis, and means for connecting the auxiliary winding in series relation with the main inducing winding.

4. In an alternating current motor, the combination with an inducing member provided with a main inducing winding and an auxiliary winding displaced therefrom and inactive at starting, of an induced member connected in series relation with the inducing member by means of exciting brushes, working brushes for closing the circuit on the induced member along an axis displaced from that of the main inducing winding, means for short-circuiting the exciting brushes, and means for connecting the auxiliary winding in series relation with the main inducing winding.

5. In an alternating current motor, the combination with an inducing member provided with a main inducing winding and an auxiliary winding displaced therefrom and inactive at starting, of an induced member connected in series relation with the inducing member by means of exciting brushes, working brushes for closing the circuit on the induced member along an axis displaced from that of the main inducing winding, means for impressing a compensating E. M. F. on the exciting brushes, and means for connecting the auxiliary winding in series relation with the main inducing winding.

6. In an alternating current motor, the combination with an inducing member provided with a main inducing winding and an auxiliary winding displaced therefrom and inactive at starting, of an induced member connected in series relation with the inducing member by means of exciting brushes, working brushes for closing the circuit on the induced member along an axis coinciding with the axis of the resultant magnetization produced by the main and auxiliary windings during normal operation, means for impressing a compensating E. M. F. on the exciting brushes, and means for connecting the auxiliary winding in series relation with the main inducing winding.

7. In an alternating current motor, the combination with an inducing member provided with a main inducing winding and an auxiliary winding displaced therefrom and inactive at starting, of an induced member closed by means of working brushes along an axis coinciding with the axis of the resultant magnetization produced by the main and auxiliary windings during normal operation, means for closing the circuit of the induced member along a second axis, and means for connecting the auxiliary winding in series relation with the main inducing winding.

8. In an alternating current motor, the combination with an inducing member provided with a main inducing winding and an auxiliary winding displaced therefrom and inactive at starting, of an induced member closed by means of working brushes along an axis displaced from that of the main inducing winding, means for closing the circuit of the induced member along a second axis, means for connecting the auxiliary winding in series relation with the main inducing winding, and means for varying the number of effective turns of the main inducing winding.

In testimony whereof, I have hereunto set my hand and affixed my seal in the presence of two subscribing witnesses.

VALÈRE ALFRED FYNN. [L s.]

Witnesses:
E. E. HUFFMAN,
ELIZABETH BAILEY.